United States Patent [19]

Lambard

[11] Patent Number: 4,859,441

[45] Date of Patent: Aug. 22, 1989

[54] PROCESS FOR THE PREPARATION OF URANIUM TETRAFLUORIDE BY THE REDUCTION OF URANIUM HEXAFLUORIDE AND SULPHUR FLUORIDES PRODUCED BY THIS PROCESS

[75] Inventor: Jacques Lambard, L'hay Les Roses, France

[73] Assignee: Commissariat A L'Energie Atomique, Paris, France

[21] Appl. No.: 176,715

[22] Filed: Apr. 1, 1988

[30] Foreign Application Priority Data

Apr. 2, 1987 [FR] France ............................. 87 04634

[51] Int. Cl.$^4$ .................. C01G 43/06; C01B 17/45
[52] U.S. Cl. .................................. 423/259; 423/258; 423/19; 423/469; 423/565
[58] Field of Search ......................................... 423/259

[56] References Cited

U.S. PATENT DOCUMENTS

| | | | |
|---|---|---|---|
| 2,638,406 | 5/1953 | Tevebaugh et al. | 423/259 |
| 2,768,872 | 10/1956 | Klein et al. | 423/259 |
| 2,907,629 | 10/1959 | Smiley et al. | 423/259 |
| 3,251,644 | 5/1966 | O'Donnell | 423/259 |
| 4,693,795 | 9/1987 | Eccles et al. | 423/259 X |

FOREIGN PATENT DOCUMENTS 0216664 4/1987 European Pat. Off. .
1586833 1/1970 France .

OTHER PUBLICATIONS

Journal of Fluorine Chemistry, 20 (1982) 277-280, "Preparation of Pure Sulfur Tetrafluoride for Synthesis of Isotopically Substituted Compounds", L. B. Asprey and E. M. Foltyn.

Primary Examiner—Brooks H. Hunt
Assistant Examiner—Virginia B. Caress
Attorney, Agent, or Firm—Pearne, Gordon, McCoy & Granger

[57] ABSTRACT

A process for the preparation of uranium tetrafluoride by reduction of gaseous uranium hexafluoride using: (1) sulphur vapor with a minimum of halogen and/or a halide, chosen from among $Cl_2$, $Br_2$, $S_2F_2$, $SCL_2$, $S_2Cl_2$, and $S_2Br_2$; or (2) a minimum of one sulphur halide chosen from among $S_2F_2$, $SCL_2$, $S_2CL_2$, and $S_2Br_2$. The ratio R of the total number of gram-atoms of sulphur present during the reduction reaction to the number of gram-moles of $UF_6$ is at least 0.6.

12 Claims, No Drawings

PROCESS FOR THE PREPARATION OF URANIUM TETRAFLUORIDE BY THE REDUCTION OF URANIUM HEXAFLUORIDE AND SULPHUR FLUORIDES PRODUCED BY THIS PROCESS

DESCRIPTION

The purpose of the invention is a process for the preparation of uranium tetrafluoride by the reduction of uranium hexafluoride.

Uranium fluorides occupy an important position in the nuclear fuel breeding process. In fact, uranium hexafluoride is used for the isotopic enrichment of uranium using the gas diffusion process because it is the gaseous compound with the highest steam pressure.

Uranium tetrafluoride is an interesting product because it is solid at room temperature and is an intermediate product in the transformation of uranium hexafluoride into metallic uranium or uranium oxide $UO_2$, which is used as fuel in nuclear power stations. It is also an intermediate product used in the preparation of $UCl_4$ and other compounds derived from $UF_6$.

Uranium tetrafluoride is a solid, not very reactive product, in contrast to uranium hexafluoride. Due to this fact, it is a practical form for the storage of uranium hexafluoride when it emerges depleted from isotopic enrichment plants.

However, it is necessary that the uranium tetrafluoride have particular characteristics in order for it to be interesting.

First of all, it should be free of uranium fluorides which have not been completely reduced to a valence of IV, such as $UF_5$, $U_2F_9$ or $U_4F_{17}$, that is, fluorides with the formula $UF_x$ when $4 < x \leq 5$, which renders the product chemically reactive and does not facilitate its storage in stable form.

Likewise, the uranium tetrafluoride should not carry certain impurites such as metalloids and organic products. Also, for metallurgical purposes, its carbon content is required to be above 100 ppm; for the manufacture of $UO_2$ ceramics, the uranium tetrafluoride should be of nuclear purity.

Furthermore, in preparing uranium metal by means of calcium or magnesium thermal process, it is necessary to use $UF_4$ in the form of a powder of sufficient density, typically at least 2 to 3. Also, densities which are too low produce uranium oxide ($UO_2$) pellets with a density which is too low to be utilized as fuel in a nuclear reactor.

The preparation of $UF_4$ for storage has a lower density requirement; however, even in this case, the uranium tetrafluoride should not be in the form of a pulverulent powder. In general, low-density powders make collection, transformation, manipulation, and storage procedures for this product more difficult and less reliable.

There are numerous procedures for the reduction of uranium hexafluoride to uranium tetrafluoride which employ a wide range of reducing agents.

From among these procedures, particular mention should be made of those which use hydrogen or dissociated ammonia as a reducing agent, as described in patents US-A-2 907 629, FR-A-1 396 388 and FR-A-1 394 917. However, these processes lead to the formation of hydrofluoric acid. This is a poor use of the fluoride in uranium hexafluoride since hydrofluoric acid is a common product which can be easily obtained by a great number of other methods. Furthermore, with these processes, when the UF is a product in the form of a fine powder, it easily absorbs the hydrofluoric acid which is simultaneously produced, which creates a contamination of the uranium tetrafluoride disastrous for certain applications and requiring additional high temperature processing. Finally, another difficulty which arises with the use of hydrogen is a partial hydrolysis of the uranium hexafluoride, which leads to the formation of uranyl oxyfluoride ($UO_2F_2$), which contaminates the uranium tetrafluoride powder which has been formed. Furthermore, the reduction process using hydrogen may cause formation of uranium fluorides which are not completely reduced to a valence of IV or fluorides which contain both uranium and other metals which are produced by thermal degradation of $UF_6$ with the walls of the reactor, causing an accumulation of solid impurities which necessitates terminating uranium tetrafluoride production in order to clean the reactor. This problem may be avoided by adding fluorine or sulphur trifluoride, as proposed by patents US-A-2 907 629 and FR-A-1 396 388, respectively, but the latter has the problem of increasing the cost of producing $UF_4$, since the market value of the by-product formed, HF, is minimal.

There are also other known processes for the reduction of uranium hexafluoride using hydrochloric acid or various halides, as described by T. A. O'Donnel, D. F. Stewart and P. Wilson in Inorg. Chem. 5 1438 1966, and by J. J. Katz and E. Rabinowitch in The Chemistry of Uranium, page 442, McGraw-Hill, N.Y. 1951.

When hydrochoric acid is used, one encounters the same problems as with hydrogen, that is, the production of hydrofluoric acid of minimal value, the contamination of uranium tetrafluoride with hydrofluoric acid and the formation of solid impurites inside the reactor.

When halides such as $PF_3$, $AsF_3$, $SiCl_4$, $AsCl_3$, $SbCl_3$, $BBr_3$, and $PBr_5$ are used, $UF_4$ can be obtained on condition that an excess of reducing agent is used. However, these reducing agents are very costly and the industrial market for the fluoride gases formed during the reduction reaction is not on the same scale as that for uranium.

When the halide is thionyl chloride ($SOCl_2$), $UF_2$ can be obtained by carrying out the reduction in a liquid state. However, the separation of the solid uranium tetrafluoride and the excess reactive liquid is difficult to carry out. On the other hand, if the process is carried out in a gaseous state, the product formed is uranium pentafluoride, as described by Moncelon et. al., in C.R. Acad. Sci. Paris, 267, C 1485, 1968.

There are also known processes for the reduction of uranium hexafluoride using sulphur or sulphur products such as $SO_2$, $SF_4$, $SCl_2$, which have the advantage of producing sulphur fluorides, in particular, $SF_4$, an interesting by-product in demand in the chemical industry, or $SF_6$, which is also of interest to the electrical industry.

Processes of this kind are described by J. Aubert, B. Cochet-Muchy and J. P. Cuer in patent FR-A-1 586 833;, B. Moncelon, J. Lucas, and T. Kikindai in C.R. Acad. Sci. Paris, 261, 1855, 1965; C. E. Johnson, J. Fisher and M. J. Steindler in J. Am. Chem. Soc., 83, 1620, 1961; and L. B. Saprey and E. M. Foltyn in J. Fluor. Chem., 20, 277, 1982.

However, with these sulphur based reducing agents, it is difficult to get complete reduction of $UF_6$ into $UF_4$. In fact, the reduction of uranium hexafluoride using sulphur, in either liquid or gaseous state, is difficult to carry out, and it is not possible to completely reduce $UF_6$ to the state of $UF_4$ without entailing sulphur contamination. The use of $SO_2$ as a reducing agent necessitates operating at a temperature of 380° C. for significant periods of time in order to produce $UF_4$. Also, this reaction is too slow to be used in the industrial sector. The use of $SF_4$ as a reducing agent necessitates operating at temperatures above 500° C., and the products formed are not solely composed of uranium tetrafluoride since intermediate fluorides such as $U_4F_{17}$ and $UF_5$ are also formed should the process not be carried with a net excess of $SF_4$ in relation to $UF_6$. Furthermore, the use of temperatures greater than 500° C. with reaction times on the order of an hour cannot be sustained in an industrial facility due to the significant problems of corrosion encountered with metals at these temperatures. The use of $SCl_2$ should theoretically lead to obtaining $UF_4$. However, as described by L. B. Asprey and E. M. Foltyn, the operating conditions used, that is, 92° C. and an excess of $UF_6$, and a molar ratio $(SCl_2)/(UF_6) < 0.25$, uranium pentafluoride ($UF_5$), not uranium tetrafluoride ($UF_4$), is obtained.

The purpose of this invention is precisely a process for the preparation of uranium tetrafluoride by the reduction of uranium hexafluoride, which mitigates these various problems, making it possible:

to produce uranium tetrafluoride not contaminated by the reducing agents or the by-products of the reaction, to completely reduce $UF_6$ into $UF_4$ without intermediate fluorides with the formula $UF_x$, to obtain uranium tetrafluoride which does not have impurities such as metals, carbon, oxides, or oxyfluorides, to obtain as a by-product of the reaction sulphur tetrafluoride ($SF_4$), which is of great commercial interest and has great additional value, to obtain $SF_4$ which is easy to separate from the components of the reaction, to insure the reduction of $UF_6$ in a continuous operation, and to obtain high-density $UF_4$ powder.

The invention's process for preparation of uranium tetrafluoride by reduction of uranium hexafluoride in a gaseous state using a reducing agent, is characterized by the fact the a reducing agent is used which is:

(1) either sulphur vapor with at least one halogen and/or one halide, chosen from among chlorine, bromine, $S_2F_2$, $SCl_2$, $S_2Cl_2$, and $S_2Br_2$, (2) or at least one sulphur halide, chosen from amount $S_2F_2$, $SCl_2$, $S_2Cl_2$, and $S_2Br_2$.

in quantities such that the R ratio of the total number of atoms of sulphur present during the reaction to the number of molecules of $UF_6$ and $(S)/(UF_6)$, is at least 0.6.

The invention's process is particularly advantageous because it leads to the formation of a uranium tetrafluoride powder which provides the purity and quality characteristics required for storage and subsequent conversion into metallic uranium and to $UO_2$, while transforming the two fluorine atoms of the uranium hexafluoride atom into a sulphur fluoride such as $S_2F_2$ or $SF_4$ which can be easily isolated from the reaction environment and is of commercial interest.

The choice of reducing agents used in the invention process has a beneficial effect on the progress of the reaction.

Also, the introduction of halogens ($Cl_2$ and $Br_2$) other than fluorine in the reaction environment leads to the formation of only the solid uranium compound sought, that is $UF_4$, to the exclusion of other uranium halides.

When the reduction is carried out with sulphur, the presence of a free halogen, such as $Cl_2$ and/or $Br_2$, or sulphur halides such as $S_2F_2$, $SCl_2$, $S_2Cl_2$ and/or $S_2Br_2$ prevents contamination of the uranium tetrafluoride due to excess sulphur, because, under the conditions of the reaction, the sulphur reacts with the free halogen used or released during the reduction of uranium hexafluoride.

In the invention's process, sulphur monofluoride ($S_2F_2$) is always present at the end of the operation, and this is interesting because $S_2F_2$ is a reducing agent for uranium fluorides which are not completely reduced to the valence of IV, such as $UF_5$, $U_2F_9$, and $U_4F_{17}$; their formation is therefore prevented, which assists the complete reduction of $UF_6$ into $UF_4$.

Contamination of uranium tetrafluoride is avoided in the invention's process. In fact, the impurities tend to react first with $S_2F_2$ or $SF_4$ present in the reaction environment rather than with $UF_6$; water and oxygen are likewise eliminated in the gaseous phase in the form of thionyl fluoride ($SOF_2$) rather than reacting with $UF_6$ to produce $UO_2F_2$, which contaminates uranium tetrafluoride and causes clogging in the reactor.

With the invention, the presence of sulphur fluorides in the facility also prevents the formation of deposits of uranium compounds such as oxides and oxyfluorides, which are unstable in the presence of $SF_4$ at the reduction temperature.

With the invention, the gaseous products formed have high steam pressures or lend themselves well to easy desorption. Due to this fact, they can be easily isolated from $UF_4$, which is not contaminated by these gaseous products.

The use of a reducing agent in the invention's process which causes the formation of sulphur fluorides necessitates, such as in the case of uranium hexafluoride, working in strictly anhydrous conditions, which are likewise necessary for $UF_6$, if one wishes to avoid its decomposition into solid $UO_2F_2$ and HF gas.

Finally, the reduction of $UF_6$ by these sulphur based reducing agents produces sulphur fluorides with high additional value, such as $S_2F_2$, $SF_4$, or $SF_6$, which have numerous industrial applications. In fact, $SF_6$ is used as an isolating material in the electric and electrostatic industries, and $SF_4$ is a fluorination agent used in organic chemistry synthesis and especially as the intermediate phase in the preparation of $SF_6$.

One may implement the invention's process by carrying out the reduction reaction with a static process in a closed reactor, or with a continuous process.

When working with a static process, the reactor may be filled and then emptied after each operation. It is also possible to inject the reagents sequentially and extract the products produced in the same fashion. It is further possible to inject the products periodically and on a continuous basis extract the gases as well as the solid products formed.

Preferably, the operation is made continuous by circulating uranium hexafluoride gas and the reducing agent in gaseous state inside a reactor, and by recovering uranium tetrafluoride as a solid product at the reactor output.

However, when operating continuously with high output levels, it is not possible to obtain uranium tetrafluoride with the desired density because its holding time inside the reactor is too brief.

This density can be improved either by using techniques for fluidized beds or beds in suspension which make it possible to increase the holding time for the uranium tetrafluoride inside the reactor, or by increasing the amount of powder after synthesis in a reactor with a neutral atmosphere or with anhydrous hydrofluoric acid at temperatures of 700° to 1000° C., for 1 to 4 hours. This additional processing step makes it possible to increase the apparent density of the UF$_4$ powder by a factor of 2 to 10 by bringing it to values between 3 and 3.7.

However, the use of the fluidized beds technique or carrying out an additional processing step has the problems of being too slow or of requiring additional handling after synthesizing UF$_4$.

One can also improve the density of the uranium tetrafluoride produced by increasing the temperature in the reaction environment. However, it is difficult to increase this temperature since it involves bringing the reactor walls to temperatures greater than 500° C., which causes corrosion problems and contamination of the UF$_4$ with metallic fluorides created by the mixing of uranium fluoride with the metals in the reactor.

With the invention, this result is obtained by also introducing fluorine into the reactor.

In fact, under the conditions of the uranium hexafluoride reduction reaction, the reducing agent used (S and/or sulphur halides) burns in the fluorine gas, thereby increasing the temperature of the reaction environment, while the walls of the reactor can be maintained at a temperature which is distinctly lower.

The combustion of sulphur in fluorine is a reaction which is well known to be very exothermic. It leads to the formation of SF$_6$ in large proportions with weak concentrations of inferior fluorides such as S$_2$F$_2$, SF$_4$ and S$_2$F$_{10}$. Likewise, the heat of the formation of SF$_6$ has been measured as being 262 kcal/mol of SF$_6$, or 1.1(10$^3$) kj/mol. The combustion of sulphur monofluoride and sulphur halides (chlorine and bromine) in fluorine are equally exothermic and for stable products, SF$_4$ and SF$_6$. Likewise, the heat of combustion of S$_2$F$_2$ in F$_2$ is 243 kcal/mol of SF$_6$ formed, or 10 kj/mol of SF$_6$. The heat of the reaction of sulphur halides with fluorine is approximately 180 kcal/mol of SF$_4$ produced, or 572 kj/mol with SCl$_2$, S$_2$Cl$_2$ and S$_2$Br$_2$.

Also, according to the invention, the temperature of the reaction environment is increased by superimposing on the reduction reaction the combustion of sulphur vapor or sulphur halides in fluorine gas.

Preferably, the fluorine gas is introduced into the reactor in a mixture with uranium hexafluoride or with a neutral gas such as nitrogen or argon. The quantity of fluorine introduced is preferably such that the (F$_2$)/(UF$_6$) molar ratio is less than 0.8.

Normally the fluorine is preheated by itself or in a mixture with argon, nitrogen, or UF$_6$, at temperatures of 100° to 300° C., before it is introduced into the reactor.

The other reagents introduced into the reactor are also preheated at temperature of between 200° and 500° C., depending on the nature of the reducing agent, the fluorine concentration and the UF$_4$ density desired.

According to the invention, the UF$_6$ reduction reaction using the above-indicated reducing agents is carried out in a gaseous phase with an excess of reducing agent in order to obtain the uranium tetrafluoride desired.

The chemical purity of uranium tetrafluoride produced is essentially determined by the nature and the relative proportion of the reagents, as well as by the temperature of the reaction;, but it does not depend on the experimental procedure for conducting the reaction if the latter is brought to completion.

By contrast, the granulometry and the density of the uranium tetrafluoride produced are conditioned by the experimental procedure.

As has been seen previously, it is possible to carry out the reduction in a closed reactor using a static process, or using a continuous process.

In the latter case, it is necessary to separate out the uranium tetrafluoride powder which is in suspension in a gaseous state, having been extracted from the reactor by traditional methods. This can be accomplished by means of cyclone separators, electrostatic filters, or porous filtering media. To make possible an enlargement of the UF$_4$ powder inside the reactor, fluidization techniques may be used, which permit control of the holding time for the powder inside the reactor. Toward this purpose, a neutral buoyant gas such as nitrogen or argon is used to make the fluidized bed. Moreover, in order to increase the density of the uranium tetrafluoride produced, the gaseous reagents introduced into the reactor are preheated.

As indicated above, the reduction should preferably be carried out in a strictly anhydrous atmosphere and the reagents, the buoyant gas and the equipment are therefore dehydrated before the reduction operation.

The invention's process may be implemented in different ways depending on whether sulphur vapor or sulphur halides are used as a reducing agent.

In all the different methods of implementing the invention's process, an excess of reducing agent is used, that is, with a ratio R=(S)/(UF$_6$) of at least 0.6 at a temperature of 100° to 500° C.

It is specified that the R ratio is caluluted from the total number of sulphur atoms used which can be introduced, first, in the form of sulphur vapor, and, secondly, in the form of sulphur halide. In this R ratio, (S) represents the ratio between the total mass of the sulphur used and the mass of one gram-atom of sulphur, and (UF$_6$) represents the ratio between the mass of UF$_6$ introduced and the molar mass of uranium hexafluoride.

According to the first method of implementation, the reducing agent used is sulphur vapor to which chlorine and/or bromine has been added, with a ratio R=(S)/(UF$_6$) of 0.6 to 6, preferably from 1 to 4, and a (Cl$_2$) and/or (Br$_2$)/(UF$_6$) molar ratio of from 0.25 (2R$^{-1}$) to (2R$^{-1}$).

In this first method of implementation, the use of a halogen (chlorine and/or bromine) in order to carry out the reduction of UF$_6$ in a gaseous state makes it possible to improve the kinetics of the reaction in a gaseous state and to eliminate the presence of sulphur in the crystallized solid UF$_4$.

Likewise, one may work with an excess of reducing agent in order to insure the complete reduction of UF$_6$ into UF$_4$, without being bothered by incompletely reduced fluorides such as UF$_5$, UF$_9$, and U$_4$F$_7$.

With this first method of implementing the invention's process, the gaseous fluorides formed are sulphur monofluoride (S$_2$F$_2$) and sulphur tetrafluoride (SF$_4$) in relative proportions dependent on the amount of excess reducing agent and the temperature. The pertinent reactions are probably the following:

$$UF_6 + 1/4\, n\, S_{2n} \xrightarrow{X_2} UF_4 + 1/2\, SF_4 \quad (1)$$

$$UF_6 + a/n\, S_{2n} \xrightarrow{X_2} UF_4 + S_2F_2 \quad (2)$$

in which $S_{2n}$ represents the sulphur in vaporous state with $1 \leq n \leq 4$ and $X_2$ represents the halogen, chlorine and/or bromine. The excess of sulphur vapor which has not reacted with $UF_6$ pursuant to reactions (1) and (2) combines with the free halogen, chlorine and/or bromine.

In this first method of implementation, the reduction can be carried out in a heated closed reactor and the products can be extracted at the end of the reaction. It is also possible to operate with an uninterrupted flow, which is preferable for continuous production of $UF_4$. In that case, the dehydrated sulphur vapor can be directed through the reactor by a current of neutral dry gas, such as nitrogen or argon, which may be preheated at temperatures of from 200° to 500° C. The uranium hexafluoride and the halogen, chlorine or bromine may be injected separately or together. Preferably, they are preheated at a temperature of from 100° to 300° C. in order to improve the quality of the uranium tetrafluoride produced. It is also possible to include the chlorine or bromine halogen in the buoyant gas for the sulphur vapor, and therefore replace part of the buoyant gas with the halogen.

The sulphur fluorides produced during the reaction, which are $S_2F_2$ and $SF_4$, can be extracted in the gaseous state as they exit the reactor by traditional methods based on physical properties (selective condensation, adsorption), or on chemical properties (chromatography, selective complexing) of these products. Thus, it is possible to extract $SF_4$ on a continuous basis by forming a solid compound with one of the numerous organic fluorides such as $BF_3$, $AsF_5$, and $SbF_5$. These solid compounds can be extracted in a gaseous state upon exiting the reactor and subsequently processed to produce $SF_4$.

It is also possible to separate by chromatography methods $SF_4$ while in gaseous state, using as the solid state sodium fluoride recovered by sulfone tetramethylene or ether dimethylic from the glycol triethylene, or fluorocarbon resins which selectively retain $SF_4$.

Sulphur monofluoride ($S_2F_2$) is thermodynamically unstable, and easily changes into a liquid state, producing $SF_4$ and sulphur, which crystallizes. It is therefore possible to remove it from the gaseous mixture in the form of $SF_4$, as above.

In this first method of implementing the invention, it is necessary to limit the quantity of reducing agent because sulphur vapor has a low vapor pressure (30 torr or 4000 Pa at 280° C.), which makes it possible for the sulphur to condense in the input piping.

Also, in order to avoid this problem, it is generally preferably to replace all or part of the sulphur with a reducing agent which has the molecular composition of sulphur, which is in the case in the other methods of implementation described below.

Thus, according to a second method of implementation of the invention, the reducing agent used is sulphur monofluoride ($S_2F_2$) with a ratio $R=(S)/(UF_6)$ of from 0.7 to 4.

In this case, the principal reduction reaction corresponds to the following diagram:

$$UF_6 + \tfrac{1}{3}S_2F_2 \rightarrow UF_4 + \tfrac{2}{3}SF_4 \quad (3)$$

This produces uranium tetrafluoride and sulphur fluoride $SF_4$, which possibly carry small quantities of $SF_6$ when operating at higher temperatures.

The reaction can be carried out in a heated closed reactor, but it can also be done continuously or with a pulsed flow, with a slow reaction rate. In the latter case, uranium hexafluoride and sulphur monofluoride would be introduced separately, preferably after having been preheated at a temperature of from 100° to 500° C. in order to improve the density of the uranium tetrafluoride formed. It is also possible to use a fluidized bed, using a current of dry neutral gas such as nitrogen, which would also be preheated to a temperature of 100° to 500° C.

According to a third method of implementation for the invention, the reducing agent used is sulphur monofluoride ($S_2F_2$), to which has been added sulpur vapor. In this case, the ratio of the number of gram-atoms of sulphur in the form of vapor $(S)_v$ to the number of gram-moles of $UF_6$ is at most equal to 1 and the ratio $R=(S)/(UF_6)$ is preferably from 0.7 to 4.

In this third method of implementation, the reduction follows reaction (3) and $S_2F_2$ is regenerated in accordance with the reaction for the vapor state:

$$UF_6 + 1/n\, S_{2n} \rightarrow UF_4 + S_2F_2 \quad (4)$$

which is a means of increasing the concentration of the reducing element $S_2F_2$.

However, this third method of implementation is susceptible to possible contamination of the $UF_4$ by sulphur. Also, it is possible that the vapor content of free sulphur not exceed the $UF_6$ content, that is the ratio $(S)_v/(UF_6)$ be greater than 1.

As above, the reaction can be carried out in a closed vessel or with a flux. In the latter case, the reagents are preferably preheated and the sulphur in the form of vapor can be introduced by a current of nitrogen or by the gas $S_2F_2$, which passes over heated sulphur.

According to a fourth method of implementation of the invention, the reducing agent used is sulphur monofluoride ($S_2F_2$) in the presence of a halogen chosen from among chlorine and/or bromine. In that case, the ratio $R=(S)/(UF_6)$ is preferably from 0.7 to 4.

In that case, the reduction reaction corresponds to reaction (3) of the second method of implementation, and the presence of a halogen, $Cl_2$ and/or $Br_2$ makes it possible to improve the purity of the $UF_4$ produced with respect to sulphur, especially when operating with a high R ratio value. Therefore, the quantity of halogen introduced is not critical; generally it is such that the $(Cl_2)$ and/or $(Br_2)(S_2F_2)$ molar ratio is less than 0.5, for example, from 0.3 to 0.4.

In this method of implementation, the chlorine and or/bromine halogen can be introduced alone or in a mixture with one of the reagents: $UF_6$ or $S_2F_2$. It is also possible to introduce into the flux a neutral gas if one wishes to increase the holding time of the $UF_4$ inside the reactor using the fluidized beds technique.

According to a fifth method of implementation for the invention, the reducing agent used is sulphur monofluoride ($S_2F_2$) and sulphur vapor in the presence of chlorine and/or bromine.

In this case, besides reaction (3) of the second method of implementation, there are reactions (1) and (2) of the first method of implementation for producing uranium tetrafluorid. The $S_2F_2$ formed by reaction (2) is also available to react with $UF_6$ in accordance with reaction (3).

In this fifth method of implementation, the quantity of sulphur carried in the form of sulphur vapor is the determining factor with regard to the amount of the chlorine or bromine halogen to be added. Generally, the quantities of halogen and of sulphur vapor are such that the $(Cl_2)$ and/or $(Br_2)/(S)_v$ ratio, with $(S)_v$ representing the number of gram-atoms of sulphur vapor, has a value of from 0.05 to 1.5. The $R=(S)/(UF_6)$ ratio is preferably from 0.7 to 4.

It is possible to carry out the reaction in a closed reactor or with a continuous process. In the latter case, the sulphur vapor may be introduced, either with the gas $S_2F_2$, or with a flow of neutral gas such as nitrogen. It is also possible to include a chlorine and/or bromine halogen just before introducing it into the reaction.

According to a sixth method of implementation for the invention, the reducing agent used is a sulphur halide chosen from $SCl_2$, $S_2Cl_2$, and $S_2Br_2$ with a ratio $R=(S)/(UF_6)$ of 0.6 to 6. The reactions which are produced correspond to the following reaction formulas, in which $X_2$ represents $Cl_2$ or $Br_2$.

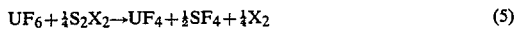  (5)

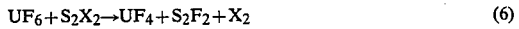  (6)

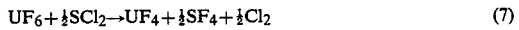  (7)

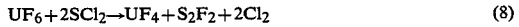  (8)

Preferably, a ratio $R=(S)/(UF_6)$ of 1 to 4 is used.

It is possible to prepare the sulphur halides used as reducing agents by passing a current of halogen over heated sulphur or over molten sulphur. The bromide $S_2Br_2$ by itself, and the chlorides $SCl_2$ and/or $S_2Cl_2$ are normally used. In the case of chlorides, sulphur monochloride is obtained by operating with an excess of sulphur before decomposing, in order to avoid its dismutation. In order to obtain sulphur bichloride in contrast, the operation is carried out with an excess of chlorine under reduced pressure. As it is difficult to isolate each of the sulphur chlorides and since their particular behavior with regard to $UF_6$ is very similar, a mixture of sulphur monochloride and sulphur bichloride as rich as possible in sulphur monochloride is usually used because it is the most effective reducing agent.

In this sixth method of implementation of the invention, the process is not limited by the steam pressure of the sulphur, and, therefore, it is possible to use high pressures with the reagents. This makes introducing the reagents into the reactor much easier, especially when operating in a continuous mode. Moreover, the use of sulphur halides (chlorides and bromide) does not involve the production of uranium compounds other than $UF_4$, and it does not contaminate the uranium tetrafluoride with sulphur compounds.

According to a seventh method of implementation for the invention, the reducing agent used is sulphur vapor and at least one sulphur halide, chosen from among $SCl_2$, $S_2Cl_2$ and $S_2Br_2$ with a ratio $R=(S)/(UF_6)$ of from 0.6 to 6.

In this instance, sulphur vapor is used as a reducing agent jointly with sulphur halides usually $S_2Cl_2$ and/or $SCl_2$, or $S_2Br_2$ only. If operating as described above with an excess of reducing agent, the products include solid uranium tetrafluoride ($UF_4$) and a gaseous mixture made up of sulphur fluorides $S_2F_2$ and $SF_4$ in proportions which depend on the conditions of the experiment, such as temperature, the R ratio and the halogen derivatives used. The reactions which take place are reactions (1), (2) and (5) to (8).

The interesting aspect of this seventh method implementation is the introduction of an excess of sulphur in the form of sulphur vapor into the same environment with a chlorine or bromine based sulphur halide which has already been formed, without having the halogen in a free state. As well, the substitution made for a free halogen, chlorine or bromine, as in reactions (1) and (2) in the first method of realization, is a sulphur halide, either a chloride like $S_2Cl_2$, $SCl_2$ or mixtures of them, or the monobromide $S_2Br_2$. In this instance, the process is not limited by the steam pressure of the sulphur vapor as in the first method of implementation, and the quantity of halogen introduced under the combined form of a sulphur halide is reduced, as in the sixth method of implementation.

In this seventh method of implementation, it is important to take care that there is a relatively sufficient quantity of sulphur halide in relation to the quantity of sulphur vapor introduced into the reactor, that is, a quantity of halogen $X_2$ (chlorine and/or bromine) carried in the sulphur halide in reaction to the total sulphur which is in the range of $(X_2)/(S)$ equal to from 0.25 $(2\text{-}R^{-1})$ to $(2\text{-}R^{-1})$.

Preferably, the sulphur halide is prepared immediately before its introduction into the reactor and the sulphur monchloride or monobromide formed is saturated in sulphur.

As indicated above, the reduction can be carried out continuously. In this instance, it is interesting to extract the sulphur tetrafluoride produced by complexing with an inorganic fluoride, and to recycle the gaseous mixture inside the reactor after having adjusted its sulphur reducing agent content. This can be done by moving the gaseous mixture over heated sulphur. It will then include, besides the initial components, sulphur monofluoride ($S_2F_2$) and possibly thionyl fluoride $SOF_2$ as impurities. The presence of $S_2F_2$ does not disturb the rest of the $UF_6$ reduction, as was seen in the second method of implementation of the invention.

According to an eighth method of implementation of the invention, the reducing agent used is sulphur monofluoride ($S_2F_2$) and at least one sulphur halide chosen from among $S_2Cl_2$, $SCl_2$ and $S_2Br_2$ with a ratio $R=(S)/(UF_6)$ of from 0.6 to 6.

In this eighth method of implementation, the reactions which take place are reactions (5) to (8) of the sixth method of implementation and reaction (3) of the fifth and/or second method of implementation. It is possible to carry out the reduction under the conditions described above, especially those given for the sixth method of implementation.

According to a ninth method of implementation of the invention, the reducing agent used is sulphur monofluoride ($S_2F_2$), sulphur vapor, and at least one halide chosed from among $S_2Cl_2$, $SCl_2$ and $S_2Br_2$ with a ratio $R=(S)/(UF_6)$ of from 0.6 to 6.

In this ninth method of implementation, the reduction is carried out jointly with reactions (5) to (8), (3), (1), (2) and possibly reaction (4). The amount of halogen $X_2$, chlorine or bromine, used with the sulphur halide will preferably be such that the ratio $(X_2)/(S)$ is from 0.25 $(2-R^{-1})$ to $(2-R^{-1})$ as in the seventh method of implementation.

The reduction can be carried out under the conditions described above.

The following examples are clearly non-limiting examples given for the purpose of illustrating the invention.

EXAMPLE 1

Reduction by sulphur vapor in the presence of chlorine

In this example, the first method of implementation of the invention is used, and the operation is carried out inside a Monel ® tubular reactor which is furnished with a pressure gauge. First of all, the sulphur ($3 \times 10^{-2}$ gram-atoms) is condensed inside the tubular reactor. A pre-processing of the reactor and the sulphur is carried out in order to eliminate impurities which would be harmful to the reaction, by injecting gaseous $UF_6$ at 50° C. under 1000 Pa, and this operation is repeated. Then $1.5 \times 10^{-2}$ moles of gaseous $UF_6$ is introduced, which corresponds to a ratio $R=(S)/(UF_6)=2$, as well as gaseous chlorine in such quantities that the ratio $(Cl_2)/(UF_6)$ is 1.5. The reactor is then heated to 350° C. and, at the end of the reaction, a gaseous mixture made up of sulphur fluorides $SF_4$, $S_2F_2$, and $SOF_2$, in a ratio of 25/75/5, sulphur chlorides $S_2Cl_2$ and $SCl_2$, as well as free chlorine are collected.

The uranium hexafluoride has completely reacted and 4 g of crystallized green solid, which are identified by X-ray as being $UF_4$, are extracted.

This uranium tetrafluoride contains neither $UF_x$ fluorides with $4 < x \leq 5$, nor oxyfluorides, nor impurities, nor sulphur, nor chlorides. The thionyl fluoride ($SOF_2$) which appears as a gaseous impurity in the products leaving the reactor, are produced by a reaction of $S_2F_2$ or $SF_4$ sulphur fluorides with traces of humidity or oxides.

COMPARATIVE EXAMPLE 1

Reduction by sulphur vapor without adding a halogen

In this example the same reactor and the same method of operation as in example 1 is used, but without adding chlorine. Also, in the very beginning, 0.5 g of sulphur ($1.5 \times 10^{-2}$ gram-atoms) of sulphur is condensed inside the reactor. A preprocessing of the reactor and the sulphur is then carried out as in example 1 and the operation is repeated. Then ($1.5 \times 10^{-2}$) moles of gaseous $UF_6$ is introduced, which correspond to a ratio $R=(S)/(UF_6)=1$. The reactor is heated to 300° C. At the end of the reaction, a gaseous mixture made up of sulphur fluorides $SF_4$, $S_2F_2$, and $SOF_2$ is obtained with the ratio 90/7/3. The uranium hexafluoride has completely reacted because it is not detectable with infrared spectroscopy. The solid product deposited on the walls of the reactor is a mixture of solid uranium fluoride and of crystallized sulphur. After extraction of the sulphur, 3.9 g of $UF_4$ and 0.21 g of sulphur which has not reacted is obtained.

EXAMPLE 2

Reduction by $S_2F_2$

In this example the second method of implementation of the invention is used and the operation is carried out is a static mode as in example 1. $1.5 \times 10^{-2}$ moles of $UF_6$ and $1.5 \times 10^{-2}$ moles of $S_2F_2$ are introduced into the reactor, which is then heated to 300° C. The R ratio is thus equal to 2.

At the end of the reaction, when the pressure remains stable, a gaseous mixture made up of sulphur fluorides $SF_4$, $S_2F_2$, and $SOF_2$ with the ratio 32/60/8, which is without $UF_6$, is removed by pumping, and 4.3 g of $UF_4$ is collected inside the reactor. The reduction of $UF_6$ is therefore complete.

EXAMPLE 3

Reduction by sulphur and $S_2F_2$ in the presence of $Cl_2$

The fifth method of implementation of the invention is used in this example, the the same reactor as that in example 1 is used. First of all, 0.5 g of sulphur ($1.5 \times 10^{-2}$ atom-grams) is condensed inside the reactor, then $10^{-2}$ moles of $S_2F_2$ and $1.5 \times 10^{-2}$ moles of $UF_6$ is introduced. The reactor is heated to a temperature of 300° C., in the presence of $4 \times 10^{-3}$ moles of $Cl_2$ The ratio of the reagents used is therefore such that $R=(S)/(UF_6)$ is 2.3 and that $(Cl_2)/(S)_v$ is 0.26.

At the end of the reaction, 4.2 g of $UF_4$ is recovered containing neither higher-numbered uranium fluorides nor sulphur-based impurities. The gaseous mixture collected includes $SF_4$, $S_2F_2$, and $SOF_2$ in the respective proportions of 30/55/10, as well as sulphur chlorides formed during the reaction.

EXAMPLE 4

Reduction by $SCl_2$

In this example the sixth method of implementation of the invention is used and the same reactor as in example 1. 5.2 g of uranium hexafluoride and $1.5 \times 10^{-2}$ moles of sulphur chloride ($SCl_2$) is introduced into the reactor and the reactor is heated to 300° C. There is therefore a ratio $(S)/(UF_6)$ equal to 1. The reaction is allowed to continue until the $UF_6$ is exhausted and at the end of the operation is a gasous mixture including $SF_4$, $S_2F_2$, and $SOF_2$ in the ratio 60/35/5, sulphur chlorides $S_2Cl_2$ and $SCl_2$, as well as chlorine are collected. There is no uranium hexafluoride detected by infrared spectroscopy. The solid product is made up of 4.5 g of uranium tetrafluoride, which contains neither higher-numbered fluorides, nor chlorides, nor sulphur. The $UF_4$ crystals are of a size of between 1 and 8 m, and their density is about 3.0.

EXAMPLE 5

Reduction by sulphur vapor and $S_2Cl_2$

The seventh method of implementation of the invention is used in this example and the reduction is carried out in continuous mode inside a tubular heated to 350° C.

The following are introduced into the reactor: First, 90 g/h of uranium hexafluoride preheated to 200° C., and secondly, sulphur chlorides, obtained by saturating a current of chlorine in sulphur by passing it over a solution of liquid sulphur maintained at 200° C., which forms a gaseous reducing mixture made up of $S_2Cl_2$ and of sulphur vapor. The relative amount of sulphur vapor represents only several % in relation to the sulphur monochloride ($S_2Cl_2$). The presure of the sulphur vapor is on the order of 500 Pa and this gaseous mixture is injected at approximately 80 g/h after preheating it to 300° C. in a mixture with nitrogen with a $S_2Cl_2$ volume ratio of 30:70. The ratio $R=(S)/(UF_6)$ is approximately 2.5.

76 g/h of uranium tetrafluoride which contains 75.2% uranium, without type $UF_x$ intermediate compounds and without chlorides, is therefore produced.

EXAMPLE 6

Reduction by sulphur chloride saturated with sulphur, with the addition of fluorine to the uranium hexafluoride In this example, the seventh method of implementation of the invention is used while operating in continuous mode as in example 5, and adding more fluorine to the uranium hexafluoride in order to increase the density of the uranium tetrafluoride produced. A tubular reactor is used, into which is injected 0.4 mol/h of a mixture of uranium hexafluoride and fluorine preheated to 200° C. in the $(F_2)/(UF_6)$ proportions of 0.5. Also injected into the reactor is a reducing mixture preheated to 300° C., which is made up of sulphur chloride saturated with sulphur, that is, composed of $S_2Cl_2$ in the amount of 0.45 mol/h of $S_2Cl_2$ and of sulphur vapor, so that the ratio $R=(S)/(UF_6)$ is approximately 3.5. The exothermicity of the reaction insures the reduction of the $UF_6$, which is completely transformed into $UF_4$, and at the reactor output, 86 g/h of $UF_4$ is collected for 100 g/h of $UF_6$ introduced.

The apparent specific mass of uranium tetrafluoride thus produced is 3.2 g/cm³. It does not contain intermediate fluoride compounds, and it is free of chlorides and sulphur. The gaseous mixture which exits the reactor is made up mainly of $S_2Cl_2$ which has not reacted, $S_2F_2$, $SF_4$ and $SF_6$ fluorides, as well as chlorine. Uranium hexafluoride is not detected in the gas extracted.

I claim:

1. A process for the preparation of uranium tetrafluoride comprising the steps of reducing gaseous uranium hexafluoride by reaction at a temperature of from 100° to 500° C. with a reducing agent to produce uranium tetrafluoride, said reducing agent comprising:
   (a) sulphur vapor and at least one member of the group consisting of $Cl_2$, $Br_2$, $S_2F_2$, $SCL_2$, $S_2Cl_2$, and $S_2Br_2$; or
   (b) at least one member of the group consisting of $S_2F_2$, $SCl_2$, $S_2Cl_2$, and $S_2Br_2$, and
regulating the quantities of reducing agent and uranium hexafluoride so that the ratio R is at least 0.6, where $R=(S)/(UF_6)$, (S) is the total number of gram-atoms of sulphur present during the reduction reaction and $(UF_6)$ is the total number of gram-moles of $UF_6$.

2. A process in accordance with claim 1, including the steps of adding fluorine gas and continuously reducing gaseous uranium hexafluoride in a reactor in the presence of said fluorine gas by circulating said fluorine gas and said gaseous uranium hexafluoride and gaseous reducing agent inside said reactor, and recovering said uranium tetrafluoride as a solid product at a reactor output.

3. A process in accordance with claim 2, including circulating said fluorine gas in an amount such that the molar ratio, $(F_2)/(UF_6)$, is less than 0.8.

4. A process in accordance with either of claim 1 or 2, wherein said reducing agent is sulphur vapor and at least one member of the group consisting of chlorine and bromine in a molar ratio $(Cl_2)$ and/or $(Br_2)$ to $(UF_6)$ of from 0.25 $(2R^{-1})$ to $(2R^{-1})$, and the ratio R is from 0.6 to 6.0.

5. A process in accordance with either claim 1 or 2, wherein said reducing agent is $S_2F_2$ and the ratio R from 0.7 to 4.

6. A process in accordance with either claim 1 or 2, wherein said reducing agent is sulphur vapor and $S_2F_2$, $(S)_v/(UF_6)$ is the ratio of the number of gram-atoms of sulphur in the form of a vapor to the number of gram-moles of $UF_6$, where $(S)_v$ is the number of gram-atoms of sulphur in the form of vapor and has a value at least equal to 1, and the ratio R is from 0.7 to 4.

7. A process in accordance with either claim 1 or 2, wherein said reducing agent is $S_2F_2$ in the presence of at least one member of the group consisting of $Cl_2$ and $Br_2$, and the ratio R is from 0.7 to 4.

8. A process in accordance with either claim 1 or 2, wherein said reducing agent is $S_2F_2$ and sulphur vapor in the presence of at least one member of the group consisting of $Cl_2$ and $Br_2$, the ratio R is from 0.7 to 4, and a molar ratio of $(Cl_2)$ and/or $(Br_2)/(S)_v$, where $(S)_v$ is the number of gram-atoms of sulphur in the form of vapor, is from 0.05 to 1.5.

9. A process in accordance with either claim 1 or 2, wherein said reducing agent is at least one sulphur halide chosen from the group consisting of $SCl_2$, $S_2Cl_2$ and $S_2Br_2$, the ratio R is from 0.6 to 6.

10. A process in accordance with either claim 1 or 2, wherein said reducing agent is at least one sulphur halide chosen from the group consisting of $SCl_2$, $S_2Cl_2$ and $S_2Br_2$, the ratio R is from 0.6 to 6, and ratio $(X_2)/(S)$ is from 0.25 $(2-R^{-1})$ to $(2-R^{-1})$, where $(X_2)$ is the number of moles of chlorine and/or bromine present in the form of halides and (S) is the total number of gram-atoms of sulphur.

11. A process in accordance with either claim 1 or 2, whrein said reducing agent is $S_2F_2$ and at least one sulphur halide selected from the group consisting of $SCl_2$, $S_2Cl_2$ and $S_2Br_2$, and the ratio R is from 0.6 to 6.

12. A process in accordance with either claim 1 or 2, wherein said reducing agent is sulfur vapor and $S_2F_2$ and at least one sulphur halide selected from the group consisting of $SCl_2$, $S_2Cl_2$ and $S_2Br_2$, the ratio R is from 0.6 to 6, and ratio $(X_2)/(S)$ is from 0.25 $(2-R^{-1})$ to $(2-R^{-1})$ where $(X_2)$ is the number of moles of $Cl_2$ and/or $Br_2$ present in the form of halides and (S) is the total number of gram-atoms of sulphur.

* * * * *